United States Patent [19]

Veragen

[11] 4,134,487
[45] Jan. 16, 1979

[54] DEVICE FOR SUPPORTING OR GUIDING A ROLLING LOAD

[75] Inventor: René Veragen, Chatou, France

[73] Assignee: Commissariat a l'Energie Atomique, Paris, France

[21] Appl. No.: 826,767

[22] Filed: Aug. 22, 1977

Related U.S. Application Data

[63] Continuation of Ser. No. 659,518, Feb. 19, 1976, abandoned.

[30] Foreign Application Priority Data

Feb. 25, 1975 [FR] France .................. 75 05834

[51] Int. Cl.² ............................................. B65G 13/02
[52] U.S. Cl. ..................................... 198/782; 104/46; 198/803
[58] Field of Search .............. 198/782, 780, 803, 471; 193/35 R, 35 S, 35 B, 35 MB; 104/35, 43, 44, 46; 100/170, 171; 254/93 R

[56] References Cited

U.S. PATENT DOCUMENTS

| | | | |
|---|---|---|---|
| 1,223,621 | 4/1917 | Scherenzel | 254/93 R |
| 1,421,009 | 6/1922 | Inman | 104/46 X |
| 2,608,286 | 8/1952 | Henschker | 198/782 |
| 3,075,654 | 1/1963 | Wheeler | 104/43 X |
| 3,711,055 | 1/1973 | Schultz et al. | 104/43 X |

FOREIGN PATENT DOCUMENTS

| | | | |
|---|---|---|---|
| 84313 | 6/1921 | Austria | 104/35 |
| 390084 | 2/1924 | Fed. Rep. of Germany | 104/46 |

Primary Examiner—John J. Love
Assistant Examiner—Douglas D. Watts
Attorney, Agent, or Firm—Cameron, Kerkam, Sutton, Stowell & Stowell

[57] ABSTRACT

A rotatable load is driven and/or supported and/or guided by wheels carried by a stationary frame and capable of running along at least one track provided on the load. The bearings of each wheel are housed within a rocker-arm, one end of which is supported on the stationary frame by elastic means and the other end of which is supported on the frame by a movable stop associated with driving means.

4 Claims, 7 Drawing Figures

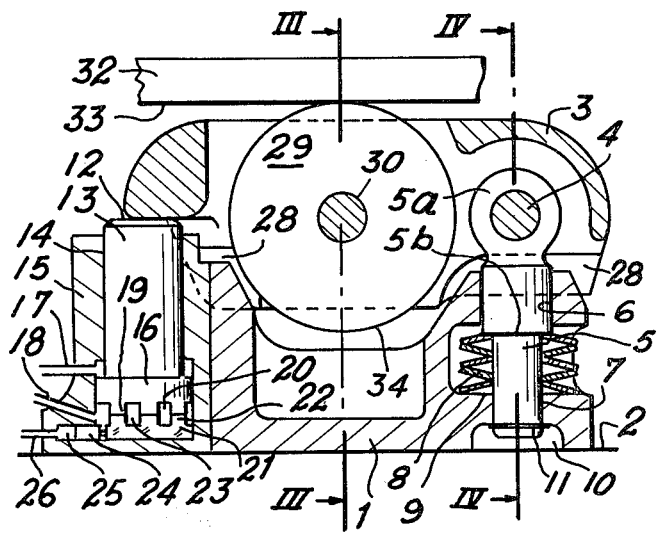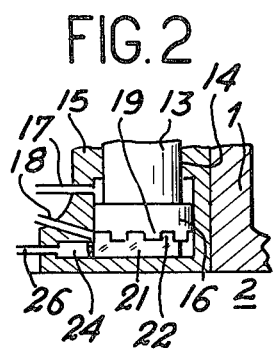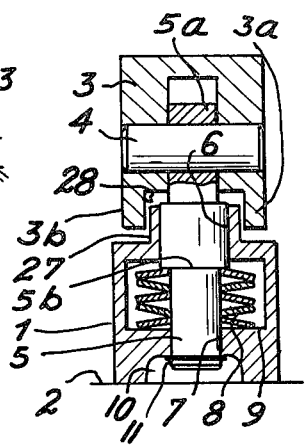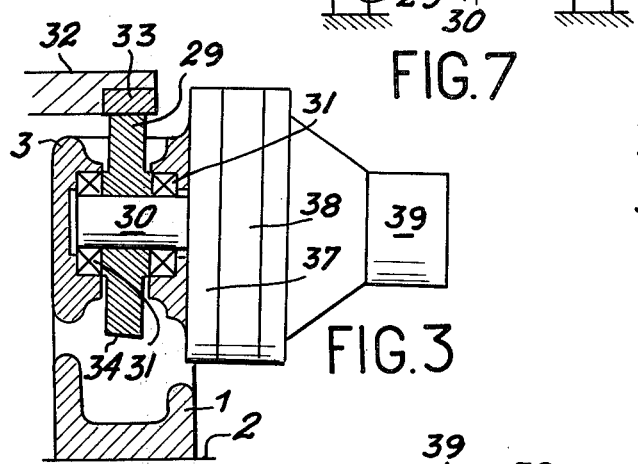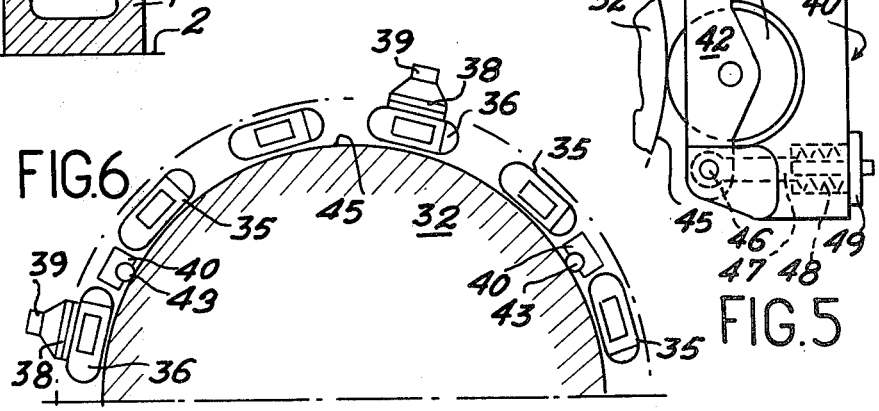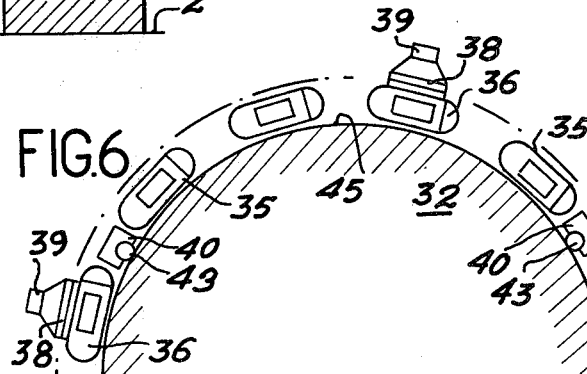

DEVICE FOR SUPPORTING OR GUIDING A ROLLING LOAD

This is a continuation of application Ser. No. 659,518 filed Feb. 19, 1976, now abandoned.

This invention relates to a device for guiding or supporting a rolling load, the device being equipped with wheels for driving and/or carrying and/or guiding the load, the wheels being carried by a stationary frame which is capable of running along at least one track provided on the load.

The invention is primarily concerned with a device of the above-mentioned type which is intended to support and/or guide a load of very substantial weight and especially a rotating a load while driving this latter in rotation if necessary.

In the case of loads of this type, a problem is presented by surface irregularities or buckling of the track by which the load is carried on the wheels of the supporting device. In the case of large rotary installations, it is in fact difficult to obtain a peripheral track which is geometrically accurate. In consequence excessive stresses arise in some components of the device and are liable to result in failures. Steps must accordingly be taken to ensure that the supporting device absorbs the surface irregularities of the track.

Moreover, by reason of the fact that the normal stresses remain of high value in the event that the load has a very considerable weight such as several hundred tons, for example, it may prove advisable to relieve the load on the rolling elements when the installation remains out of service over a long period of time, in which case the rolling support device is relayed by a stationary support.

The aim of the present invention is to satisfy these different conditions. To this end, a supporting or guiding device of the aforementioned type is essentially distinguished by the fact that the bearings of each wheel are housed within a rocker-arm, one end of which is supported on said stationary frame by elastic means and the other end of which is supported on said frame by means of a movable stop associated with first driving means.

Said elastic means accordingly serve to absorb the surface irregularities of the load track and to prevent the appearance of excessive stresses, especially in the track-wheels and bearings. As can readily be understood, the stiffness of said elastic means is calculated so as to ensure that these latter support the load without undergoing excessive deflection but yield to a slight extent at the time of an increase in the values of applied stress.

An arrangement in accordance with the invention also makes it possible to ensure that the elastic means are subjected only to a part of the load which is exerted on the corresponding wheel together with an amplification of the vertical displacement of said wheel which is of small value, thus facilitating the construction of the device and making it possible to employ elastic means having a lesser degree of stiffness.

The invention provides advantageous improvements, especially in the case of a device for supporting a load of substantial weight and especially a rotating mass but also in the case of a device for guiding a rotating mass by reason of the fact that the peripheral track of this latter also has surface irregularities, and especially in the case in which the center of gravity of the load is displaced off-center with respect to its axis of rotation; in fact, excessive stresses are also liable to appear in this case at the level of the guiding wheels and bearings.

In a particularly advantageous embodiment, a device for supporting or guiding in accordance with the invention is distinguished by the fact that the aforementioned end of the rocker-arm which is supported on said frame by elastic means is mounted for pivotal motion about an axis parallel to the surface of the corresponding track on a pintle which is slidably mounted in the frame and that said elastic means are compressed between a bearing surface of the frame and an annular shoulder of the pintle.

In this manner, the rocker-arm is permitted to carry out a small pivotal motion about said axis as a result of surface irregularities of the track. This arrangement also facilitates the assembly of the elastic means which can be engaged over said pintle.

In another advantageous embodiment, a device in accordance with the invention is distinguished by the fact that the aforementioned movable stop which serves to support one end of the rocker-arm on said frame is associated with first driving means for bringing said movable stop selectively into a first position in which the rocker-arm is maintained so as to ensure that the wheel is applied against the corresponding track of the load and into a second position in which the wheel can be moved away from the track by said rocker-arm.

In consequence, the load on the rolling elements can be relieved when the installation remains out of service over a long period of time and said elements can be replaced if necessary.

Since the driving means aforementioned are advantageously of the hydraulic type, said movable stop can be constituted by the free end of the piston of a first jack.

In accordance with yet another advantageous feature of the invention, said first jack is provided with mechanical locking means for selectively maintaining its piston in said first position and in said second position.

This arrangement in fact offers the advantage of preventing any displacement of the jack piston even when the supply circuit is at zero pressure, thus avoiding the need to ensure that a constant oil pressure is maintained when the wheel is intended to be applied against the corresponding track of the load. This also forestalls any danger of accidental downward motion of the jack piston in the event of leakage in said supply circuit.

In accordance with one embodiment, a device in accordance with the invention can further be distinguished by the fact that said mechanical locking means comprise a spacer member which is capable of moving within the bottom end of the cylinder of said first jack beneath that end of the piston which is remote from the free end thereof, said spacer member being associated with a second driving means for displacing said member between a location in which the piston is maintained in the first position thereof and a location in which said piston is capable of occupying the second position thereof.

Said mechanical locking means preferably comprise a first grid which is rigidly fixed to that end of the piston which is remote from the free end thereof, a second grid movable in the bottom end of the cylinder of said first jack and capable of occupying a first location in which the cross-bars of the first grid are applied against the cross-bars of the second grid so as to maintain the piston in said first position, and a second location in which the cross-bars of the first grid occupy the spaces formed between the cross-bars of the second grid so as to permit said piston to occupy said second position, and a second driving means adapted to displace the second grid between its first and its second locations.

Said second driving means can be constituted by a second jack whose piston is coupled to said second grid, in which case steps are advantageously taken to ensure that the cylinder of the second jack is in communication with the cylinder of the first jack.

This arrangement makes it possible to employ a second jack of the single-acting type.

One embodiment of the invention is described hereinafter by way of example but not in any limiting sense, reference being made to the accompanying drawings, wherein:

FIG. 1 is an axial sectional view of a supporting device in accordance with the invention for a load which rotates transversely to the axis of the track-wheel, the piston of the first jack being in the top position;

FIG. 2 illustrates the mechanical locking means of FIG. 1, the piston of the first jack being in the bottom position;

FIGS. 3 and 4 are transverse sectional views taken respectively along lines III—III and IV—IV of FIG. 1;

FIG. 5 is a plan view of a guiding device in accordance with the invention;

FIG. 6 is a half-view in plan showing at the periphery of the circular platform of a rotating load an array of driving and/or supporting devices and guiding devices in accordance with the invention;

FIG. 7 is a schematic diagram which illustrates the positioning of two diametrically opposite track-wheels with respect to a peripheral track of a rotating load.

It will be assumed that the device described below by way of example is intended to support and in some instances to drive in rotation a load having a very considerable weight such as, for example, the top closure plug of the type which is fitted in a nuclear reactor pressure vessel and can weigh several hundred tons. This closure plug is not shown in detail in the figures.

The supporting device shown in FIGS. 1 to 4 comprises a frame 1 fixed on a base structure 2 by means of screws or bolts (not shown). A rocker-arm 3 is supported and guided by the frame 1 in the following manner: one end of the rocker-arm (shown in FIG. 4) carries a horizontal shaft 4, both ends of which are forcibly fitted, for example, within opposite bores formed in two lateral cheeks 3a and 3b of the rocker-arm. The ear 5a of a pintle 5 is pivotally mounted on said shaft 4, said pintle being mounted for sliding motion along a vertical axis within bores 6 and 7 of the frame 1. The pintle 5 is subjected to an upward elastic restoring force by elastic means constituted by a stack of dished washers 8 or a so-called Belleville spring pack which undergoes deflection through a small displacement under a substantial load, said dished washers being fitted over the pintle and compressed between an annular shoulder 5b of said pintle and a bearing surface 9 of the frame 1. The bottom surface of the frame is hollowed-out at 10 in order to permit a small vertical displacement of the pintle 5. Finally, a stop-washer 11 is mounted on the lower end of the pintle so as to limit the upward displacement of said pintle.

The other end of the rocker-arm 3 has a horizontal bearing face 12 on which said rocker-arm bears on the frame 1 by means of a movable stop. In accordance with one embodiment of the invention, said movable stop is constituted by the free end of the piston 13 of a first hydraulic jack, the cylinder of the jack being constituted by a bore 14 formed in a member 15 which is rigidly fixed to the frame 1. Said first jack is of the double-acting type and the hydraulic fluid can be brought selectively on each side of the head 16 of the piston 13 via ducts 17, 18.

The piston 13 is associated with mechanical locking means for locking said piston in the top position (hereinbefore designated as the first position) even at zero pressure. To this end, the bottom surface of the head 16 is designed in the form of a grid, the cross-bars 19 of which extend at right angles to the plane of FIG. 1 and are separated by splines 20. Said grid is permitted to cooperate with a second grid 21 which is capable of moving in the bottom end of the cylinder 14 and is also provided with cross-bars 22 separated by splines 23 with a spacing which is identical with that of the cross-bars 19. The grid 21 is capable of moving in a horizontal direction in the plane of FIG. 1 and is coupled to a second jack piston 24 which is displaceable within a horizontal bore 25 of the member 15. Said jack can be supplied with hydraulic fluid through a duct 26.

Since one end of the rocker-arm 3 is capable of pivotal motion about two axes whilst the other end simply bears on the end of the piston 13, said rocker-arm must necessarily be guided. To this end, the frame 1 is provided with two pairs of machined bearing faces 27 which are capable of cooperating with two pairs of corresponding machined faces 28 of the rocker-arm (as shown in FIG. 4).

The rocker-arm which has just been described is in turn fitted with a track-wheel 29 having a shaft 30, the ends of which are supported in internal lateral recesses of the rocker-arm, by means of bearings 31 which therefore constitute the bearings of said wheel 29.

It is assumed that the load (not shown in the drawings) has a circular platform 32 whose bottom peripheral surface is designed in the form of a flat circular track 33. Accordingly, since the peripheral rolling surface 34 of the wheel 29 is slightly conical, the shaft 30 of said wheel is intended to be slightly inclined with respect to the plane of the track 33 in the manner which is shown in FIG. 7.

As can be readily understood, it would also be possible to design the track 33 so that this latter extends along the surface of a cone having a downwardly directed vertex in the axis of rotation of the platform 32, in which case the shaft 30 of the wheel 29 could be horizontal. However, this arrangement would have the disadvantage of greater constructional difficulty and of entailing the use of very powerful means for guiding the platform, especially if the center of gravity of this latter is not located on its axis of rotation.

In any case, the load platform 32 can be carried by a set of supporting units of the type described in the foregoing and generally designated by the reference 35 in FIG. 6. Between a certain number of units 35 can be interposed units 36 which have both a supporting and a driving function (for example one drive unit for two units which only have a supporting function).

To this end, it is only necessary to ensure that the shaft 30 of the wheel 39 is coupled to driving means carried by the rocker-arm 3 by means of a bearing plate 37 (as shown in FIG. 3). The driving assembly can be constituted by a low-speed hydraulic or electric motor or can comprise a reducing-gear unit 38 driven by a hydraulic or electric motor 39.

The units 35 and 36 which have just been described operate in the following manner:

in the position shown in FIG. 1, the cross-bars 19 of the grid 16 are located opposite to the cross-bars 22 of the grid 21 and the piston 13 is then locked in the top position even in the event of zero pressure in the bottom end of the cylinder 14. Any possible leakage is therefore not likely to have any consequential effect and enhanced safety is achieved. The free end of the piston 13 then behaves as a rigid stop for the horizontal bearing face 12 of the rocker-arm.

The other end of the rocker-arm is capable of a small displacement in the vertical direction in opposition to the elastic restoring force of the Belleville spring pack 8, thus preventing the wheel 29 and its bearings 31 from being subjected to excessive stresses as a result of surface irregularities or buckling of the track 33.

When the wheels 29 are no longer required to support the load, for example when the load has reached the desired position and can then rest on stationary supports (not shown), the duct 18 is supplied with hydraulic fluid under pressure whilst the ducts 17 and 26 are connected to the collector-tank. The pressure within the main cylinder 14 then forces back the small piston 24 which accordingly displaces the grid 21 until the cross-bars 22 of this latter come into position opposite to the splines 20 of the grid 16. The pressure within the cylinder 14 is then released, the piston 13 moves downwards and the cross-bars 19 of the grid 16 are engaged within the splines 23 of the grid 21 (as shown in FIG. 2). The load on the wheel 29 having thus been relieved, it may prove necessary to admit a low value of pressure into the duct 17 in order to ensure that the piston 13 takes up its lowermost position and to overcome friction, especially at the level of the piston-rings. Should this not be the case, the first jack 13-14 can clearly be of the single-acting type insead of the double-acting type, in which case the duct 17 is dispensed with.

In order to re-apply the load to the wheels 29, the pressure is admitted through the duct 18 so as to lift the piston 13 whilst the duct 17 communicates with the collector-tank. Since the pressure is also admitted through the duct 26 at an equal or higher value according as the small piston 24 is of a differential-action type or not, the small piston 24 thrusts back the grid 21 into the position shown in FIG. 1 in which the cross-bars 22 are located opposite to the cross-bars 19 of the grid 16. The pressure in the bottom end of the cylinder 14 can then be released and the piston 13 accordingly comes to rest on the cross-bars of the grid 2.

In the case of loads of lower weight, it should be noted that the above-mentioned cross-bars could be replaced by studs so that the studs of one of the grids can engage within corresponding holes of the other grid.

In addition to the supporting units 35 and driving units 36 described in the foregoing, provision can be made for units 40 which serve to carry out lateral guiding of the platform 32 (as shown in FIGS. 5 and 6) and which can be three in number, for example.

The units just mentioned comprise a stationary frame 41, a rocker-arm 42 which carries a lateral guiding wheel 43 being attached to said frame.

One end of the rocker-arm 42 is pivoted to the frame 41 at 44 about an axis which is parallel to a lateral track 45 of the platform 32. The other end of the rocker-arm is pivoted at 46 to the end of a pintle 47 which is mounted within a recess of the frame and subjected to the actions of elastic restoring means 48 which are mounted in the same manner as the Belleville washers 8 and compressed between an annular shoulder of the pintle and a washer 49 which is secured to the frame.

The above arrangement is put into effect in such a manner as to ensure that a spacing of 1 or 2 mm remains between the periphery of the guiding wheel 43 and the track 45. Moreover, the elastic means 48 are subjected to a prestress which permits withdrawal of the wheel 43 when the load carried by this latter exceeds a predetermined value. The withdrawal of said wheel can also be utilized, for example in conjunction with a microswitch, for the purpose of tripping an alarm or a safety device which automatically stops the movement of rotation of the load. It is thus possible to forestall any danger of accident in the event that the load is displaced off-center to an excessive degree.

A guiding unit of this type in any case offers the same advantages as the supporting units, especially in the case of surface irregularities of the track 45.

It is wholly apparent that the units in accordance with the invention can be employed not only for supporting, driving or guiding rotating loads but also for carrying out the same functions on a load which rolls on a rectilinear track.

As has in any case been brought out by the foregoing, the invention is clearly not limited to the modes of construction and application which have been more especially contemplated but extends on the contrary to all alternative forms.

I claim:

1. A device for supporting and guiding a rolling load, comprising wheels for driving and also for carrying and also for guiding the load, a stationary frame supporting said wheels, at least one flat track on said load receiving said wheels, bearings for each of said wheels, a rocker-arm provided with first and second end portions supporting said bearings, elastic means supporting said first end portion of said rocker-arm on a bearing surface on said frame, a movable stop supporting said second end portion on said frame, a first position for said stop in which said wheels are in contact with said track, a second position for said stop in which said wheels are withdrawn from said track, an upper part for said stop allowing when said stop is in said first position the pivoting of said rocker-arm around said second end portion by said elastic means, a first driving means for said movable stop moving said stop between said first position and said second position and means for pivoting said first end portion with respect to an axis parallel to the surface of said track, said first driving means including a first jack, a piston for said jack and a free end for said piston forming a part of said movable stop, said first jack including mechanical locking means for selectively maintaining said piston in said first position and also in said second position, said mechanical locking means including a spacer member moving within the bottom end of a cylinder for said first jack beneath that end of said piston which is remote from the free end thereof, a second driving means for said spacer members for displacing said member into a location for maintaining said piston of said first jack in said first position and into a location for maintaining said piston in said second position.

2. A device according to claim 1, said mechanical locking means including a first grid rigidly fixed to that end of said piston of said first jack remote from said free end thereof, a second grid movable within the bottom end of said cylinder of said first jack into a first location in which said cross-bars of said first grid bear against said cross-bars of said second grid to maintain said piston in said first position, and said second grid being movable into a second location in which said cross-bars of said second grid occupy the spaces between said cross-bars of said first grid whereby said piston occupies said second position and second driving means for moving said second grid between said first and the second locations.

3. A device according to claim 2, said second driving means including a second jack, a cylinder and a piston in said cylinder for said second jack connected to said second grid.

4. A device according to claim 3, including a cylinder for said second jack in communication with said cylinder of said first jack.